(12) United States Patent
Thid et al.

(10) Patent No.: US 8,005,097 B2
(45) Date of Patent: Aug. 23, 2011

(54) INTEGRATED CIRCUIT AND METHOD OF ARBITRATION IN A NETWORK ON AN INTEGRATED CIRCUIT

(75) Inventors: Rikard Lennart Thid, Tyreso (SE); Kees Gerard Willem Goossens, Eindhoven (NL); Andrei Radulescu, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 298 days.

(21) Appl. No.: 11/914,250

(22) PCT Filed: May 16, 2006

(86) PCT No.: PCT/IB2006/051526
§ 371 (c)(1),
(2), (4) Date: Nov. 13, 2007

(87) PCT Pub. No.: WO2006/123287
PCT Pub. Date: Nov. 23, 2006

(65) Prior Publication Data
US 2008/0186991 A1    Aug. 7, 2008

(30) Foreign Application Priority Data

May 18, 2005   (EP) .................................... 05104171

(51) Int. Cl.
*H04L 12/28* (2006.01)
(52) U.S. Cl. ...................................... 370/400
(58) Field of Classification Search ................... 370/400
See application file for complete search history.

(56) References Cited

U.S. PATENT DOCUMENTS
6,751,698 B1    6/2004    Deneroff
(Continued)

FOREIGN PATENT DOCUMENTS
EP        1130855 A2  *  9/2001
(Continued)

OTHER PUBLICATIONS

"A Router Architecture for Networks on Silicon"—Proceedings of Progress 2001 2nd Workshop on Embedded Systems to Rijpkema et al.*

(Continued)

*Primary Examiner* — Ayaz R Sheikh
*Assistant Examiner* — Hai-Chang Hsiung

(57) ABSTRACT

The invention relates to an integrated circuit and to a method of arbitration in a network on an integrated circuit. According to the invention, a method of arbitration in a network on an integrated circuit is provided, the network comprising a router unit, the router unit comprising a first input port, a second input port and an output port, wherein the router unit receives at least one first packet via the first input port, and wherein the router unit receives at least one second packet via the second input port, the router unit arbitrating between the first packet and the second packet, characterized in that the step of arbitrating is performed using a first label and a second label, the first label being attached to the first packet, and the second label being attached to the second packet. This method relies on the perception that the arbitration performed by a router should be based on connection arbitration instead of input port arbitration. This means that instead of merely arbitrating between the contending input ports in a router, the arbitration should also take into account the connections to which packets correspond. This can be done by attaching labels to the packets, which labels are used in the arbitration process. In this way, it is possible to achieve a fair allocation of bandwidth to different connections, regardless of on which input ports these connections are established.

7 Claims, 9 Drawing Sheets

U.S. PATENT DOCUMENTS

| | | | |
|---|---|---|---|
| 2002/0027914 A1* | 3/2002 | Shinohara | 370/389 |
| 2002/0085552 A1 | 7/2002 | Tandon | |
| 2002/0105965 A1 | 8/2002 | Dravida | |
| 2004/0100981 A1* | 5/2004 | Kitchin | 370/428 |

FOREIGN PATENT DOCUMENTS

| | | | |
|---|---|---|---|
| EP | 1130855 | A2 | 9/2002 |
| WO | WO0072533 | A1 | 11/2000 |
| WO | WO2004051942 | A1 | 6/2004 |

OTHER PUBLICATIONS

"Scheduling Algorithms for Input-Queued Cell Switches"—Ph.D. thesis, University of California at Berkeley, 1995, by N. McKe.*

Written Opinion of the International Searching Authority for International Application No. PCT/IB2006/051526.

* cited by examiner

- R1, arbitration/relabeling:
  - I1 / 1(A) -> O2 / 1(A)
  - I2 / 1(A) -> O2 / 2(A)
  - I1 / 2(B) -> O1 / 1(B)
  - I2 / 2(B) -> O1 / 2(B)
  - I2 / 3(B) -> O1 / 3(B)
  - I1 / 1(B) -> O1 / 1(B)
  - I2 / 1(C) -> O1 / 2(C)
  - I1 / 2(C) -> O1 / 3(C)
  - I2 / 2(A) -> O2 / 1(A)

FIG.6

- R2, arbitration&relabeling:
  - I1 / 1(B) -> O2 / 1(B)
  - I2 / 1(B) -> O2 / 2(B)
  - I1 / 2(C) -> O1 / 1(C)
  - I2 / 2(B) -> O2 / 3(B)
  - I2 / 3(B) -> O2 / 4(B)
  - I1 / 1(C) -> O1 / 1(C)
  - I2 / 1(B) -> O2 / 1(B)
  - I1 / 2(B) -> O2 / 2(B)
  - I2 / 2(C) -> O1 / 2(C)
  - I2 / 3(C) -> O1 / 3(C)

FIG.7

INTEGRATED CIRCUIT AND METHOD OF ARBITRATION IN A NETWORK ON AN INTEGRATED CIRCUIT

The invention relates to a method of arbitration in a network on an integrated circuit, the network comprising a router unit, the router unit comprising a first input port, a second input port and an output port, wherein the router unit receives at least one first packet via the first input port, and wherein the router unit receives at least one second packet via the second input port, the router unit arbitrating between the first packet and the second packet.

The invention also relates to an integrated circuit comprising a network, the network comprising a router unit, the router unit comprising a first input port, a second input port and an output port, wherein the router unit is arranged to receive at least one first packet via the first input port, and wherein the router unit is arranged to receive at least one second packet via the second input port, the router unit further being arranged to arbitrate between the first packet and the second packet.

Networks-on-Chip (NoCs) provide a means for interconnecting modules in complex multi-processor systems. In such networks, so-called switches or routers support the process of delivering data at the correct destination in the systems. For the purpose of organizing data traffic the data is usually split into packets. A packet comprises a header section, a payload section and a tail section. The header section contains information which can be used by a router to determine the final destination of a packet and to determine to which output-port of the router the packet should be sent. The payload section contains the actual data which should be transmitted to the final destination. Typically, a packet corresponds to a certain connection. The connection defines a piece of data which should be sent through the network; this piece of data comprises a plurality of packets. Each connection is identified by a connection identifier (connection-id); each packet carries in the header section the connection identifier so that the router can determine to which connection the packet corresponds.

A major challenge in NoC router design is to achieve a fair allocation of bandwidth between different connections. Current best-effort solutions do not take connection fairness into account and guaranteed-throughput services that could be used to achieve fairness involve pre-allocation of bandwidth in certain time-slots and a long setup time. It is desirable to have the bandwidth fairly distributed among channels that are not pre-allocated, but the existing designs for routers in NoCs fail to accomplish this. In particular, the methods for arbitration which are deployed by such routers fail to provide a fair allocation of bandwidth to different contesting connections.

It is an object of the invention to provide a method for arbitration in a network on an integrated circuit, which method provides a fair allocation of bandwidth to different contesting connections. This object is achieved by providing the method according to claim 1. This object is also achieved by providing an integrated circuit according to claim 6. According to the invention, a method of arbitration in a network on an integrated circuit is provided, the network comprising a router unit, the router unit comprising a first input port, a second input port and an output port, wherein the router unit receives at least one first packet via the first input port, and wherein the router unit receives at least one second packet via the second input port, the router unit arbitrating between the first packet and the second packet, characterized in that the step of arbitrating is performed using a first label and a second label, the first label being attached to the first packet, and the second label being attached to the second packet.

This method relies on the perception that the arbitration performed by a router should be based on connection arbitration instead of input port arbitration. This means that instead of merely arbitrating between the contending input ports in a router, the arbitration should also take into account the connections to which packets correspond. This can be done by attaching labels to the packets, which labels are used in the arbitration process. In this way, it is possible to achieve a fair allocation of bandwidth to different connections, regardless of on which input ports these connections are established.

It is noted that a router may have a third input port and further input ports, in which case the principles of this invention also apply. Similarly, a router may have more than one output port.

It is also noted that the labels attached to the packets in this invention are additional to information already present in state-of-the-art packet headers, such as path or destination. The labels according to the invention are used by the router/switch arbitration schemes to effectuate quality of service such as guaranteed bandwidth or latency, not for routing or switching the packet to the appropriate output (for which state-of-the-art packet headers are used). They are therefore distinct from addresses, paths, or labels used for routing, e.g. by IP routers or multi-protocol label-switching techniques.

According to the invention, an integrated circuit comprising a network is provided, the network comprising a router unit, the router unit comprising a first input port, a second input port and an output port, wherein the router unit is arranged to receive at least one first packet via the first input port, and wherein the router unit is arranged to receive at least one second packet via the second input port, the router unit further being arranged to arbitrate between the first packet and the second packet, characterized in that the router unit is arranged to arbitrate using a first label and a second label, the first label being attached to the first packet, and the second label being attached to the second packet.

According to an aspect of the invention, as claimed in claim 2, the first label is indicative of the result of a previous arbitration for the first packet, and the second label is indicative of the result of a previous arbitration for the second packet. In this case, the first label is also referred to as a first index value and the second label as a second index value. The index value indicates the result of a previous arbitration, for example as performed by a network interface unit or another router in the network.

According to a further aspect of the invention, as claimed in claim 3, the method comprises the steps: if the first label is smaller than or equal to the second label and the first label is greater than a label of a packet selected in a previous clock cycle, the router unit selects the first packet; if the first label is greater than the second label and the second label is greater than the label of the packet selected in the previous clock cycle, the router unit selects the second packet; otherwise, the router unit selects from the fist packet and second packet the packet with the lowest label and starts a new arbitration cycle. With this basic principle various arbitration algorithms can be developed, as will be explained with reference to the preferred embodiments described hereinafter.

Another aspect of the invention is claimed in claim 4, wherein the first packet corresponds to a first connection for transmitting data through the network, and wherein the second packet corresponds to a second connection for transmitting data through the network. A further aspect of the invention is claimed in claim 5, wherein at least one further label is assigned to the first connection and/or to the second connection. The use of multiple labels for a connection has the advantage that the bandwidth allocation to different connections can be manipulated in a relatively easy manner.

An aspect of the integrated circuit according to the invention is claimed in claim 7, wherein the router unit comprises an arbiter unit, the arbiter unit being arranged to arbitrate between the first packet and the second packet. It is noted that a router unit may be equipped with a global arbiter or with a plurality of arbiters.

Another aspect of the integrated circuit according to the invention is claimed in claim 8, wherein the arbiter unit is arranged to perform relabeling by redefining the first label and the second label.

The present invention is described in more detail with reference to the drawings, in which:

FIG. 5, FIG. 6 and FIG. 7 illustrate an example of relabeling performed by routers according to the invention;

Figure 1:
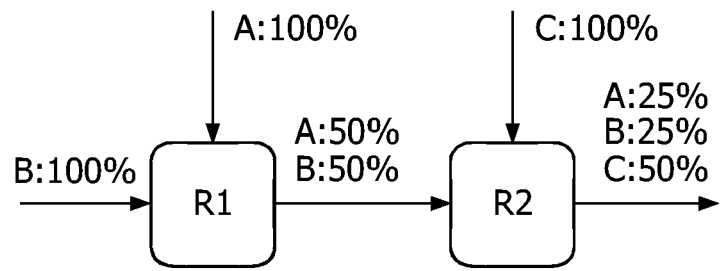
FIG. 1 illustrates an allocation of bandwidth to different contesting connections, according to the prior art.

FIG. 1 illustrates an allocation of bandwidth to different contesting connections, according to the prior art. Typically, data traffic is handled by a store-and-forward network that uses very efficient queues located at each input port of a router. For example, in FIG. 1 the first router R1 has two input ports. First packets corresponding to a first connection A are delivered at the first input port of the first router R1. Second packets corresponding to a second connection B are delivered at the second input port of the first router R1. So in the router there are two queues, one for storing the first packets and one for storing the second packets. Because each queue is used for a single connection, there is no problem with the bandwidth allocation and if a round-robin arbitration scheme is used (for example) then 50% of the bandwidth of the output port of the first router R1 will be allocated to the first connection A, and 50% of this bandwidth to the second connection B.

However, in this situation the second router R2 can no longer provide an even bandwidth distribution. The second router R2 also has two input ports. Both the first packets (corresponding to connection A) and the second packets (corresponding to connection B) are delivered at the first input port of the second router R2. Third packets, corresponding to a third connection C, are delivered at the second input port of the second router R2. So in this case one queue contains packets corresponding to two connections (A, B) and the other queue contains packets corresponding to only one connection (C). If the typical round-robin arbitration scheme is used, packets are selected in an alternating fashion from the queues, so in a certain amount of time more packets from the third connection (C) will be selected than packets from the remaining connections (A, B). This results in an uneven bandwidth distribution: 25% of the bandwidth for connection A, 25% of the bandwidth for connection B, and 50% of the bandwidth for connection C. The round-robin algorithm maintains only a fair access for the input ports (queues) but no attention is paid to the connections. Hence, connections that arrive at an input port with a relatively low occupation will be granted more bandwidth than connections that arrive at an input port with a relatively high occupation.

Figure 2:
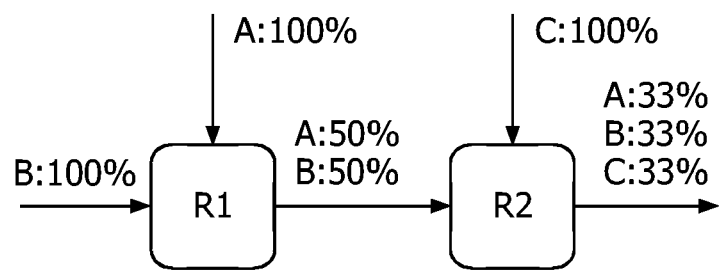
FIG. 2 illustrates an allocation of bandwidth to different contesting connections, according to the invention.

FIG. 2 illustrates an allocation of bandwidth to different contesting connections, according to the invention. This is an example of an even bandwidth distribution between connections arriving at different input ports. In this case, the second router R2 is able to allocate an equal amount of bandwidth (approximately 33%) to each connection A, B and C. Hereinafter the arbitration principles and algorithms which achieve such an even bandwidth distribution will be explained.

The method according to the invention relies on the perception that the arbitration performed by a router should be based on connection arbitration instead of input port arbitration. This means that instead of merely arbitrating between the contending input ports in a router, the arbitration should also take into account the connections to which packets correspond. In this way, it is possible to achieve a fair allocation of bandwidth to different connections, regardless of on which input ports these connections are established. If a router performs arbitration between a first connection and a second connection, it uses a first label attached to a first packet (which corresponds to the first connection) and a second label attached to the second packet (which corresponds to the second connection) to perform the arbitration. Using the basic principle that labels attached to packets are used to arbitrate between packets, various arbitration algorithms can be developed.

As an example, an index value that indicates the result of a previous arbitration cycle can be used as such a label. This can be understood by explaining the arbitration policy of a network interface unit, which is responsible for transforming data into packets and for injecting these packets into the network.

Figure 3:
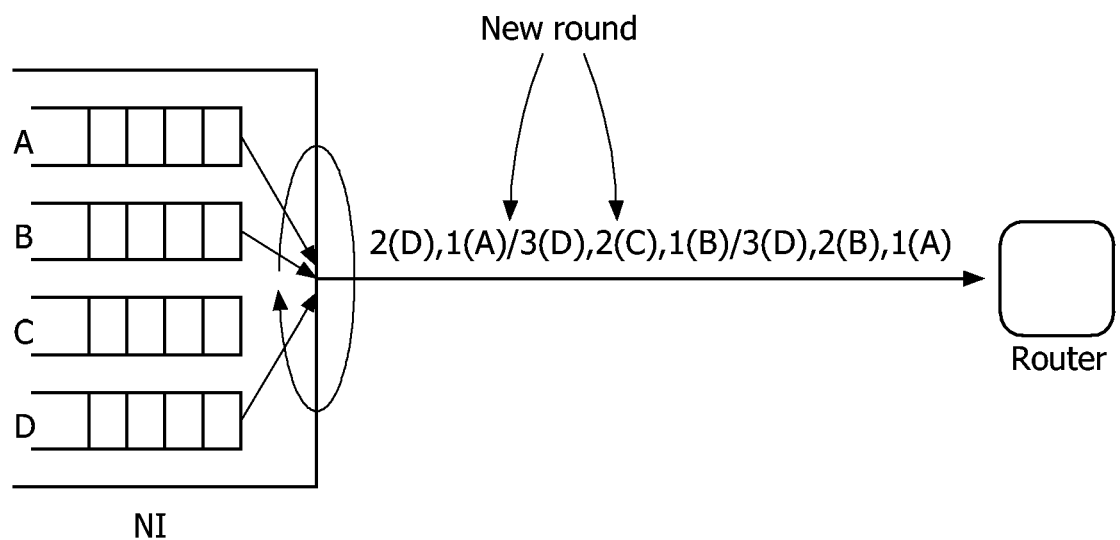
FIG. 3 illustrates an example of a method of arbitration employed by a network interface unit, according to the invention.

FIG. 3 illustrates an example of a method of arbitration employed by a network interface unit, according to the invention. The routers in the network repeatedly complete arbitration cycles (also referred to as rounds), which result in a sequence of packets being sent to an output port of the routers. An index value within the round is attached to every packet in the network. When packets are to be injected into the network, a network interface unit (NI) has packets corresponding to a plurality of connections stored in queues (usually FIFO-based). At the network interface unit stage each queue is still assigned to a single connection, so each queue contains packets corresponding to a single connection. An example is given in FIG. 3, where packets from several connections (labeled from A to D) are picked and sent to a router. The first packet from connection A is labeled 1(A), where 1 is the index value of the packet. The following packet which is taken from connection B gets the next index value 2, labeled 2(B). If no packet is available in a certain queue, the next queue with available packets is selected and the index value is increased by one. In the example C is empty, and the next packet is sent from connection D with index value 3:3(D). After the last connection (D), a new round starts with index values starting again from 1. It is easy to detect when a new round begins over a link; just compare the index value of the current packet with the one previously transmitted on that link. An index value that is lower than the previous index value indicates that a new cycle has begun. This simple trick detects the cycles that were depicted in FIG. 3. The index value is relabeled on the output port to create new rounds. The index value is increased with every packet. When a round is completed, the index value is reset to 1.

These index values can be used by a router to arbitrate between packets which are delivered at its input ports. The index values can, for example, be carried in the header sections of the packets, such that the router can retrieve the values and use them for the execution of its arbitration algorithm.

The router policy can be implemented as follows. The router must route the packets to the right output port. Hence, the router may have to distribute the packets in a round on an input port to several output ports. On the input ports, the packets are grouped into new rounds again. The general rule is that two packets from different rounds on the same input port must not belong to the same round on the output port. The arbiter which implements the router policy may perform relabeling in order to achieve this.

Figure 5:
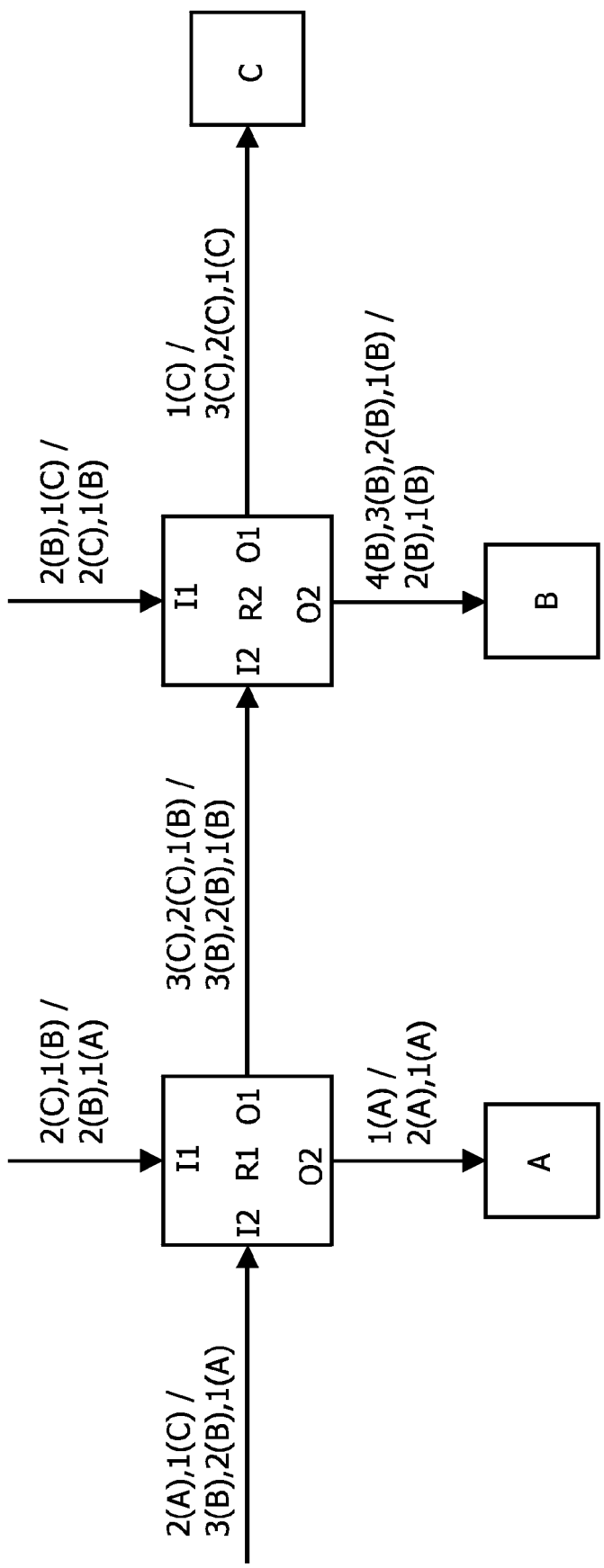

FIG. 5, FIG. 6 and FIG. 7 illustrate an example of relabeling performed by routers according to the invention. FIG. 5 provides the general overview of the arbitration which is performed on labels, using the principles as set forth. Furthermore, the routers perform relabeling. FIG. 6 schematically shows the arbitration and relabeling which is performed by router R1. FIG. 7 schematically shows the arbitration and relabeling which is performed by router R2.

Figure 8:
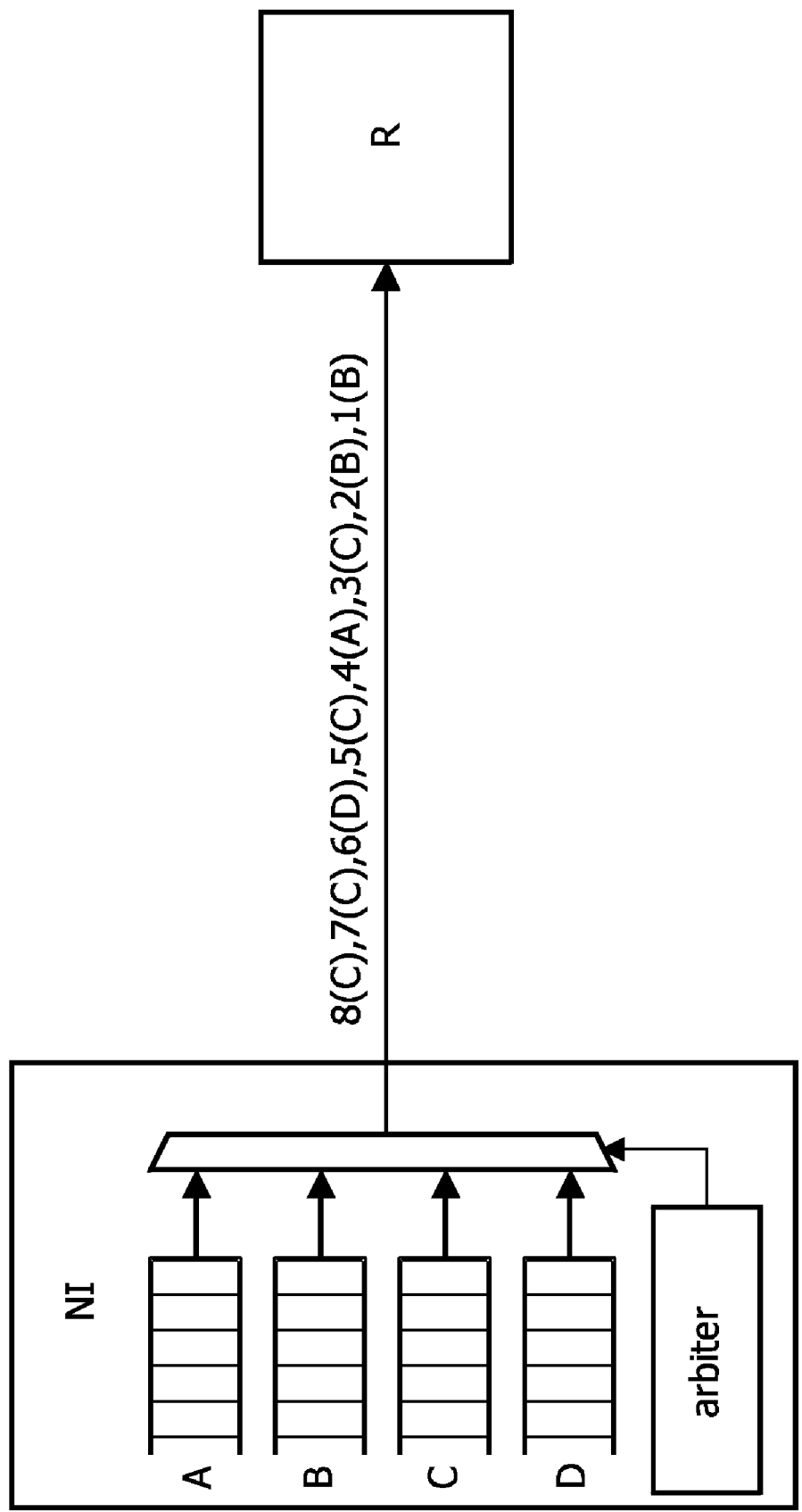
FIG. 8 illustrates how bandwidth allocation to different connections can be manipulated by assigning different numbers of labels to them, according to the invention.

FIG. 8 illustrates how bandwidth allocation to different connections can be manipulated by assigning different numbers of labels to them, according to the invention. Connections can be assigned different link shares by assigning different numbers of labels to them, such that some connections are served more often than other connections during a current arbitration cycle. For example, one label is assigned to connection A so that connection A has a link share of 12.5%. Connection B has a higher priority: two labels are assigned to connection B so that connection B has a link share of 25%. Connection C has the highest priority: four labels are assigned to connection C so that connection C has a link share of 50%. Finally, one label is assigned to connection D so that connection D has a link share of 12.5%.

Figure 9:
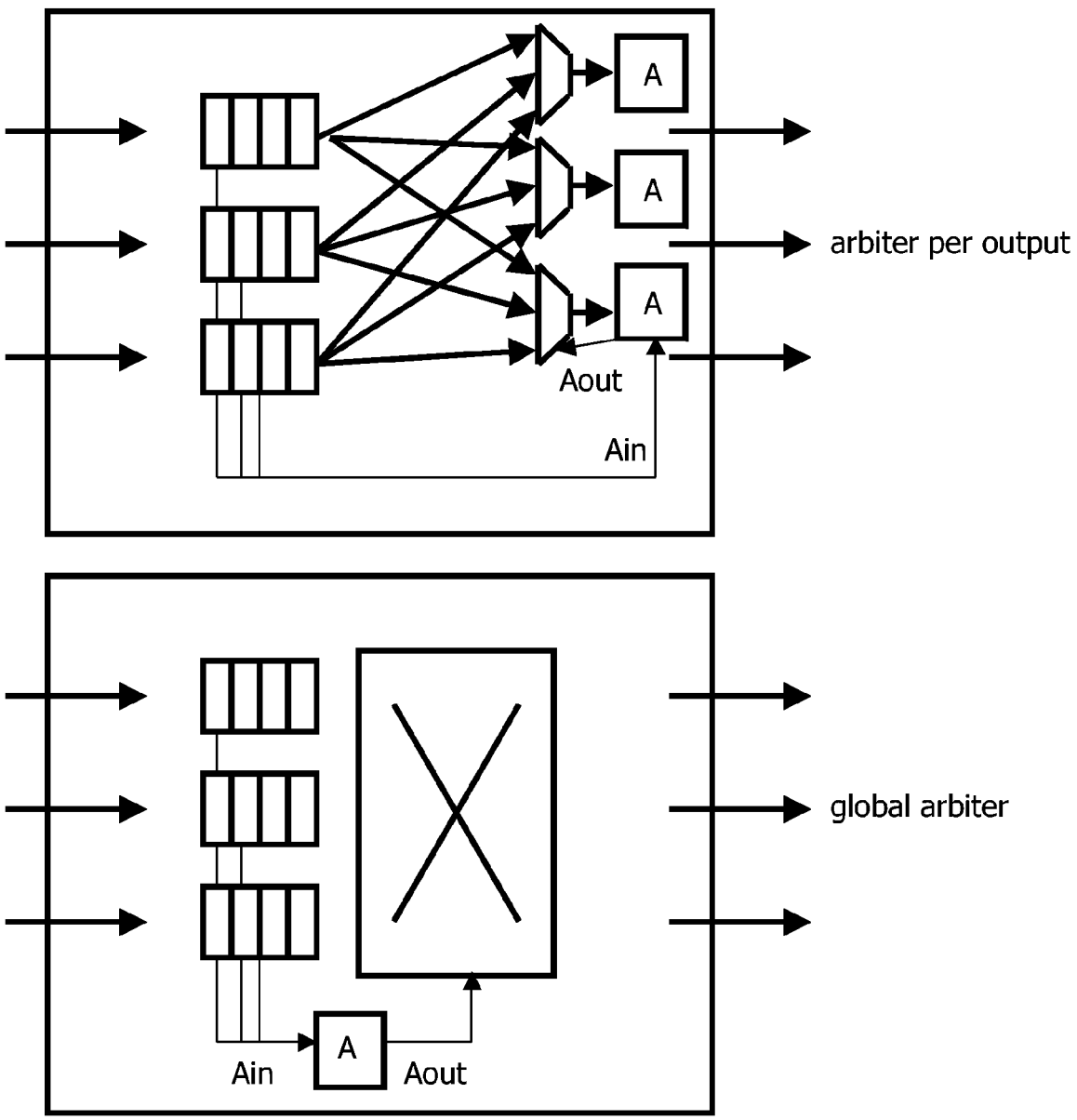
FIG. 9 illustrates the difference between an arbiter per output and a global arbiter.
Figure 10:
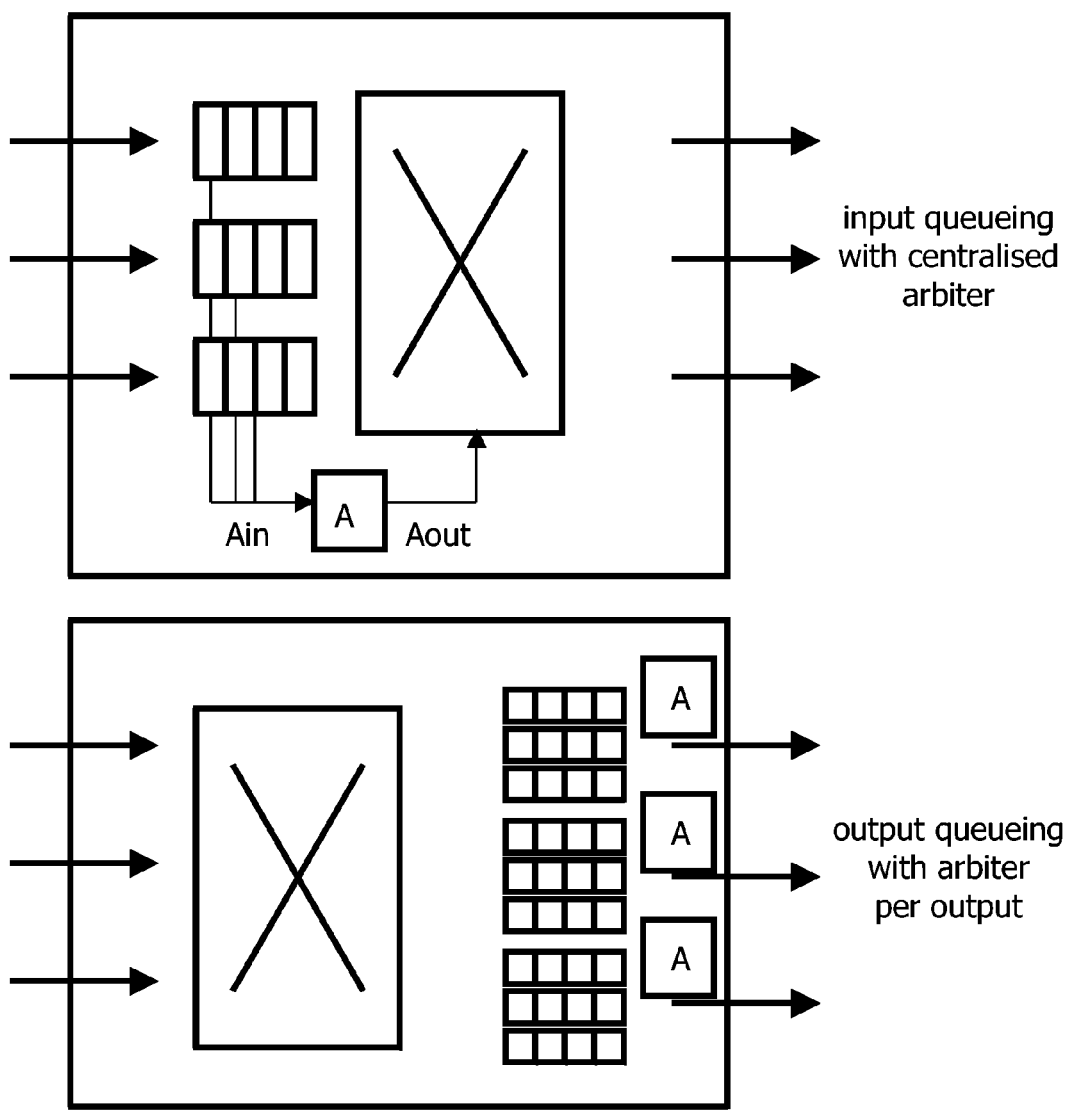
FIG. 10 illustrates the difference between input queuing and output queuing.

FIG. 9 illustrates the difference between an arbiter per output and a global arbiter. FIG. 10 illustrates the difference between input queuing and output queuing. Typically, input queuing uses a centralized or global arbiter to arbitrate between data delivered by different input queues. When output queuing is used usually one arbiter is provided for each output port.

Figure 11:
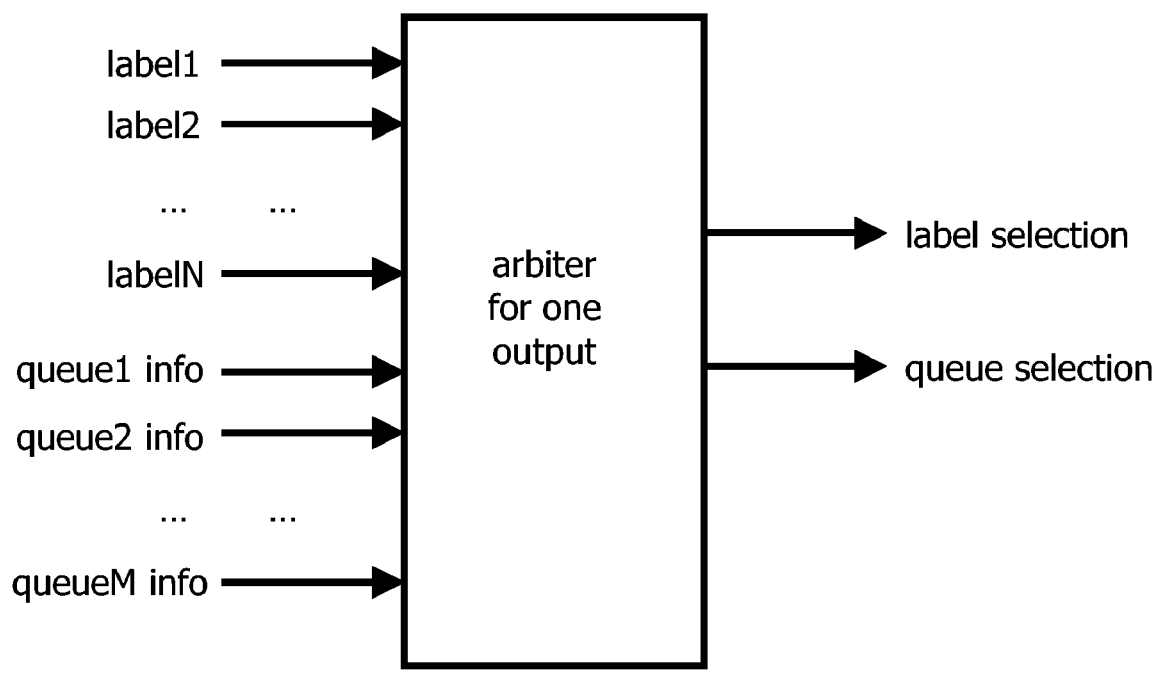
FIG. 11 illustrates an example of an arbiter for one output, according to the invention.
Figure 12:
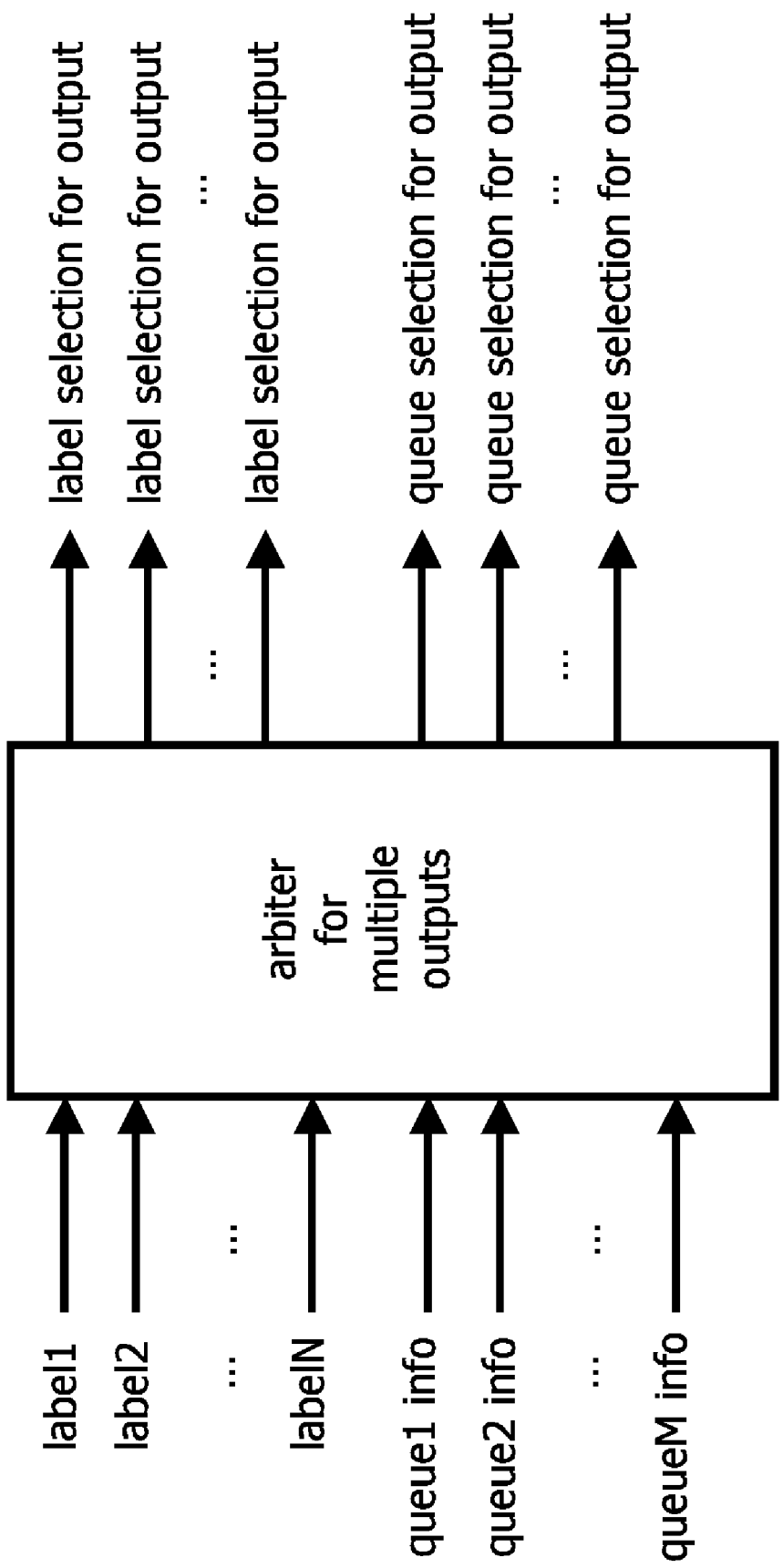
FIG. 12 illustrates an example of an arbiter for multiple outputs, according to the invention.

FIG. 11 illustrates an example of an arbiter for one output, according to the invention. The number of input queues which are considered by the arbiter at the same time equals M. For example, in the case of input queuing M is smaller than or equal to the number of input ports of the router or switch. In the case of output queuing M is smaller than or equal to the number of input ports multiplied by the number of output ports of the router or switch. In the case of virtual circuit queuing M is smaller than or equal to the number of virtual circuits. The number of labels which are considered by the arbiter at the same time equals N. Normally N is equal to M, so the arbiter considers one label per input queue. However, multiple labels may be considered per input queue, such that the bandwidth allocation to different connections can be manipulated. In the latter case N could be larger than M. Normally only the first packet of a selected queue is output by the arbiter, but optionally a subsequent packet within the queue can also be selected (for example if N is greater than M). FIG. 12 illustrates an example of an arbiter for multiple outputs, according to the invention. Label selection and input selection may take place for each output of the arbiter.

Hereinafter a number of algorithms are presented which apply the router policy to routers that use input queuing. It is known that in routers using input queuing, fairness can be negatively affected by head-of-line blocking. This means that if a packet cannot be transmitted, subsequent packets in the same input queue are also delayed. Using output queuing instead of input queuing can solve this problem. In that case, there is a separate output queue for each destination or output port, so that head-of-line blocking cannot occur.

Figure 4:
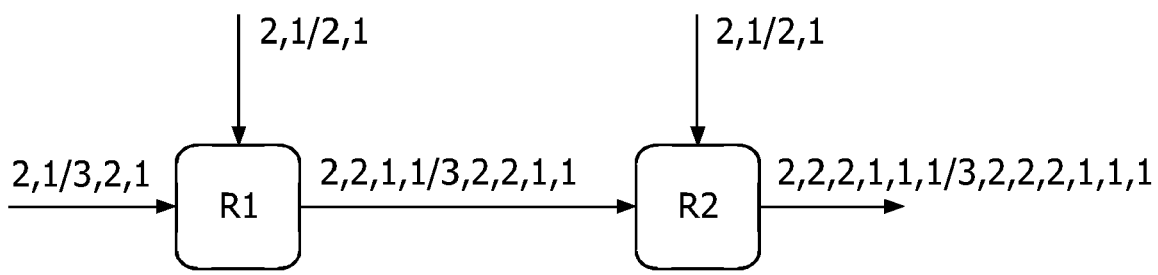
FIG. 4 illustrates an example of a method of arbitration employed by a router which achieves a desired allocation of bandwidth, according to the invention.

A first algorithm comprises the following steps. During a clock cycle the front part of each input port is examined and the packet having the lowest index value, yet greater than or equal to the index value of the packet which was selected during the previous clock cycle, is selected for delivery to the output port. If there are no packets with an index value greater than or equal to the index value of the previously selected packet, a new arbitration cycle (round) is started and the packet with the lowest index value is selected. The result of this router policy is shown in FIG. 4. The numbers represent the index values of the packets. It is noted that a router may have more than one output port; if this is the case the algorithm is executed for each output port concurrently.

A second algorithm is slightly different from the first algorithm in that a single comparator is used; accordingly the router keeps track of the previously used packet and the index value of this packet. The index value of a packet in the front part of an input queue (current index) is compared to the stored index value (previous index). If the current index is greater than or equal to the previous index, the packet having the current index is selected. If the current index is lower than the previous index, the packet having the current index is not selected and the next input queue is checked. A round is completed if all input queues have been read. Again, this algorithm can be executed concurrently for each output port if the router has more than one output port.

The second algorithm has the advantage that it is simpler and cheaper to implement, but it is probably less fair than the first algorithm and it is expected to generate a burst-like output. With reference to FIG. 11, the first algorithm uses a value '1' for variable N and a value equal to the total number of input queues for variable M. The second algorithm uses a value '1' for variable N and '1' for variable M.

It is noted that the arbiter may use any known arbitration scheme for performing the arbitration according to the invention, for example round-robin, weighted round-robin, time-division multiple access (TDMA), priority-based scheduling, dead-line based scheduling, and rate-controlled schemes.

It is remarked that the scope of protection of the invention is not restricted to the embodiments described herein. Neither is the scope of protection of the invention restricted by the reference symbols in the claims. The word 'comprising' does not exclude other parts than those mentioned in a claim. The word 'a(n)' preceding an element does not exclude a plurality of those elements. Means forming part of the invention may both be implemented in the form of dedicated hardware or in the form of a programmed general-purpose processor. The invention resides in each new feature or combination of features.

The invention claimed is:

1. A method of arbitration in a network on an integrated circuit, the network including a router unit that has a first input port, a second input port and an output port, the method comprising:

receiving at least one first packet, including a first label, via the first input port, wherein the first label represents an index value that is indicative of a result of a previous arbitration for the first packet;

receiving at least one second packet, including a second label, via the second input port, wherein the second label represents an index value that is indicative of a result of a previous arbitration for the second packet; and arbitrating between the first packet and the second packet using the first label and the second label and a previously selected packet, wherein said arbitration comprises the steps of:

selecting the first packet if the first label is smaller than or equal to the second label and the first label is greater than a label of the packet selected in a previous clock cycle;

selecting the second packet if the first label is greater than the second label and the second label is greater than the label of the packet selected in the previous clock cycle, otherwise, selecting from the first packet and second packet the packet with the lowest label and starting a new arbitration cycle; and relabeling the first and second labels corresponding to first and second packets based on the arbitration.

2. A method as claimed in claim 1, wherein the first packet corresponds to a first connection for transmitting data through the network, and wherein the second packet corresponds to a second connection for transmitting data through the network.

3. A method as claimed in claim 2, wherein at least one further label is assigned to at least one of the first connection and the second connection.

4. An integrated circuit comprising:
a network that includes a router unit, the router unit comprising:
a first input port,
a second input port; and
an output port, wherein the router unit is arranged to receive:
at least one first packet including a first label, via the first input port, and
at least one second packet, including a second label, via the second input port, the first and second labels representing index values being determined based on a prior arbitration of the first and second packets, respectively, the router unit arbitrating between the first packet and the second packet using the first label and the second label and a previously selected packet;

wherein said arbitration comprises the steps of:
selecting the first packet if the first label is smaller than or equal to the second label and the first label is greater than a label of the packet selected in a previous clock cycle;

selecting the second packet if the first label is greater than the second label and the second label is greater than the label of the packet selected in the previous clock cycle, otherwise, selecting from the first packet and second packet the packet with the lowest label and starting a new arbitration cycle; and relabeling the first and second labels to corresponding first and second packets based on the arbitration.

5. An integrated circuit as claimed in claim 4, wherein the router unit comprises an arbiter unit, the arbiter unit being arranged to arbitrate between the first packet and the second packet.

6. An integrated circuit as claimed in claim 5, wherein the arbiter unit is arranged to perform the relabeling by redefining the first label and the second label.

7. A network routing arbitration method operable in a router unit that has a first input port, a second input port and an output port, the method comprising:
receiving at least one first packet, including a first label, via the first input port, wherein the first label represents an index value that is indicative of a result of a previous arbitration for the first packet;

receiving at least one second packet, including a second label, via the second input port, wherein the second label represents an index value that is indicative of a result of a previous arbitration for the second packet; and arbitrating between the first packet and the second packet using the first label and the second label and a packet selected in a previous clock cycle, wherein said arbitration comprises selecting that packet, between the first and second packet, having a lowest index value, yet greater than or equal to the index value of the packet selected in the previous clock cycle;

otherwise, selecting from the first packet and second packet the packet with the lowest label and starting a new arbitration cycle; and relabeling the first and second labels corresponding to first and second packets based on the arbitration.

* * * * *